(12) United States Patent
Huang et al.

(10) Patent No.: US 12,537,069 B2
(45) Date of Patent: Jan. 27, 2026

(54) MEMORY DEVICE AND CONTROL METHOD THEREOF

(71) Applicant: MACRONIX International Co., Ltd., Hsinchu (TW)

(72) Inventors: Shih-Chang Huang, Penghu County (TW); Han-Sung Chen, Hsinchu (TW)

(73) Assignee: MACRONIX International Co., Ltd., Hsinchu (TW)

( * ) Notice: Subject to any disclaimer, the term of this patent is extended or adjusted under 35 U.S.C. 154(b) by 135 days.

(21) Appl. No.: 18/661,711

(22) Filed: May 13, 2024

(65) Prior Publication Data

US 2025/0349372 A1    Nov. 13, 2025

(51) Int. Cl.
| | | |
|---|---|---|
| *G11C 16/34* | (2006.01) | |
| *G11C 16/10* | (2006.01) | |
| *G11C 16/14* | (2006.01) | |
| *G11C 16/28* | (2006.01) | |

(52) U.S. Cl.
CPC ........ *G11C 16/3459* (2013.01); *G11C 16/102* (2013.01); *G11C 16/14* (2013.01); *G11C 16/28* (2013.01)

(58) Field of Classification Search
CPC ... G11C 16/3459; G11C 16/102; G11C 16/14; G11C 16/28
USPC ..................................................... 365/185.22
See application file for complete search history.

(56) References Cited

U.S. PATENT DOCUMENTS

| | | | |
|---|---|---|---|
| 10,747,448 B2 | 8/2020 | Kwon et al. | |
| 11,656,934 B2 | 5/2023 | Liu et al. | |
| 2004/0032772 A1* | 2/2004 | Takahashi | G11C 11/406 |
| | | | 365/202 |
| 2007/0086238 A1* | 4/2007 | Ohta | G11C 16/28 |
| | | | 365/185.2 |
| 2008/0055985 A1* | 3/2008 | Kanda | G11C 11/5621 |
| | | | 365/185.03 |
| 2014/0198579 A1 | 7/2014 | Sarpatwari et al. | |

(Continued)

FOREIGN PATENT DOCUMENTS

CN    112506809    3/2021

OTHER PUBLICATIONS

"Office Action of Taiwan Counterpart Application", issued on Mar. 19, 2025, p. 1-p. 3.

*Primary Examiner* — Amir Zarabian
*Assistant Examiner* — Daniel John King
(74) *Attorney, Agent, or Firm* — J.C. PATENTS

(57) ABSTRACT

Disclosed are a memory device and a control method thereof. The memory device may be a high-capacity and high-performance three-dimensional NAND flash memory. The control method includes the following steps. Data for performing a programming operation on a specific memory cell area is obtained. A number of memory cells in a predetermined potential state in the data are counted as a first number value. The programming operation is performed on the specific memory cell area based on the data. A read operation is performed based on a reference voltage corresponding to the predetermined potential state. A number of memory cells in the predetermined potential state in the specific memory cell area after the programming operation are counted as a second number value. Whether the specific memory cell area has program disturbances is determined based on the first number value and the second number value.

20 Claims, 6 Drawing Sheets

(56) References Cited

U.S. PATENT DOCUMENTS

2019/0362798 A1 11/2019 Yang et al.
2023/0154553 A1* 5/2023 Lee .................... G11C 16/102
                                                    365/185.22

* cited by examiner

MEMORY DEVICE AND CONTROL METHOD THEREOF

BACKGROUND

Technical Field

The disclosure relates to a control technology applied to a memory device (e.g., NAND flash memory), and in particular relates to a memory device and a control method thereof.

Description of Related Art

Integrated circuit memory with high capacity and high performance, which includes 3D NAND flash memory, is continuously developing. It aims to increase data storage density by reducing the size of memory cells using a 3D stacking technology and triple-level cells (TLC).

By programming operations, selected memory cells in a memory device are adjusted the threshold voltages of the selected memory cells so as to store corresponding data. However, the magnitudes of the adjusted threshold voltages vary among the memory cells, resulting in a dispersed distribution of the threshold voltages of the memory cells. The threshold voltages of part of the memory cells might be easily adjusted to a wrong potential state due to the inherent characteristics of the part of the memory cells or the influence of memory cells nearby, resulting in read errors. This problem is referred to as program disturbances. However, the identification of the degree of program disturbances is difficult during the verification steps in a programming process.

SUMMARY

The disclosure provides a memory device and a control method thereof for determining that particular memory cell areas located in a memory cell array have more severe program disturbances so as to facilitate other operations of the memory device or for a user's reference.

The disclosure provides a control method of a memory device. The memory device is suitable for a memory cell array having a plurality of memory cell areas. The control method includes the following steps. Data for performing a programming operation on a specific memory cell area is obtained. The specific memory cell area is one of the plurality of memory cell areas. A number of memory cells in a predetermined potential state in the data are counted as a first number value. The programming operation is performed on the specific memory cell area based on the data. A read operation is performed on the specific memory cell area based on at least one reference voltage corresponding to the predetermined potential state. A number of memory cells in the predetermined potential state in the specific memory cell area after the programming operation are counted as a second number value. And, whether the specific memory cell area has a program disturbance is determined based on the first number value and the second number value.

A memory device of the disclosure includes a memory cell array and a memory controller. The memory cell array includes a plurality of memory cell areas. The memory controller is used for controlling the memory cell array. The memory device is used for performing the following steps. Data for performing a programming operation on a specific memory cell area is obtained. The specific memory cell area is one of the plurality of memory cell areas. A number of memory cells in a predetermined potential state in the data are counted as a first number value. The programming operation is performed on the specific memory cell area based on the data. A read operation is performed on the specific memory cell area based on at least one reference voltage corresponding to the predetermined potential state. A number of memory cells in the predetermined potential state in the specific memory cell area after the programming operation are counted as a second number value. And, whether the specific memory cell area has a program disturbance is determined based on the first number value and the second number value.

Based on the above, the memory device and the control method thereof described in the embodiments of the disclosure are used for counting a number of memory cells in the predetermined potential state in a specific memory cell area after the programming operation and comparing the number of the memory cells with a number of memory cells in the predetermined potential state in the data used for performing the programming operation, thereby determining whether the specific memory cell area has a more severe program disturbance. Through the control method, particular memory cell areas in a memory cell array and having more severe program disturbances may be marked, thereby facilitating other operations of the memory device (e.g., reducing the use of memory cell areas having more severe program disturbances, determining whether to re-perform the programming operation, etc.), or providing references to users or manufacturers when using the memory device so as to improve the data reliability of the memory device.

DESCRIPTION OF THE EMBODIMENTS

Figure 1:
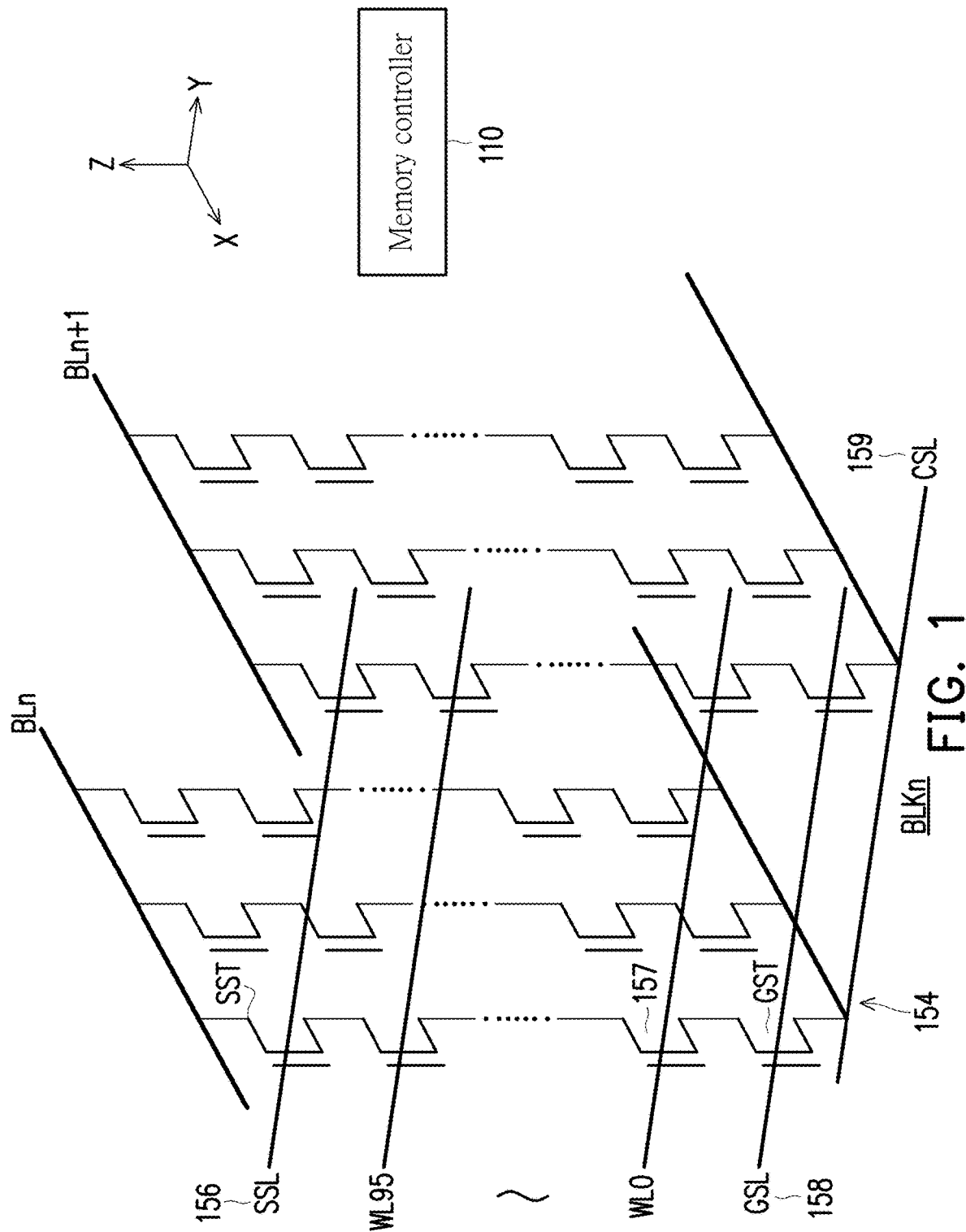
FIG. 1 is a structural schematic diagram of a three-dimensional memory cell of a memory device according to an embodiment of the disclosure.

FIG. 1 is a structural schematic diagram of a three-dimensional (3D) memory cell of a memory device 100 according to an embodiment of the disclosure. The memory device 100 in this embodiment may include the 3D memory shown in FIG. 1 and be, for example, a NAND cache memory device. The memory device 100 includes a memory cell array and a memory controller 110. A 3D block BLKn represents a part of the memory cell array. The memory controller 110 may include corresponding hardware (e.g., control logic, voltage drivers, address decoders, data input/output circuits, page buffer circuits, etc.). The memory controller 110 controls the memory cell array and the corresponding hardware to implement the steps in the embodiment of the disclosure.

Multiple memory cells in the 3D block BLKn are configured in three dimensions (e.g., XYZ coordinate system). Taking a memory cell 157 as an example, the memory cell 157 is coupled to a corresponding word line WL0 and a corresponding bit line BLn. Word lines (e.g., word lines WL0 to WL95) are formed by corresponding conductor layers. Memory cells in the 3D block BLKn may be divided into multiple pages. Each of the pages may be, for example, a layer of memory cells in an XY plane. In other words, multiple memory cells in a memory cell string 154 belong to different pages. Memory cells on the same layer (the same page) are coupled to the same word line (e.g., one of the word lines WL0 to WL95) and receive a corresponding word line voltage. Memory cells on different layers (different pages) are coupled to different word lines (e.g., the word line WL0 and the word line WL95) and receive different corresponding word line voltages.

A memory cell string (e.g., the string 154) includes multiple memory cells connected vertically in series along a direction Z. The memory cells are configured to be coupled to a string select transistor SST of a string select line SSL 156. The memory cells may also be configured to be coupled to a ground select transistor GST of a ground select line GSL 158. The string 154 is connected to one or more drivers (e.g., one or more data drivers). The string 154 including the memory cell 157 is connected to a common source line CSL 159 through the ground select transistor GST. The string select line SSL 156 may be a conductive line or a conductive layer formed on top of each page (or word line layer). Each memory cell string (e.g., the string 154) is connected to a corresponding bit line (e.g., the bit line BLn). A sense amplifier is coupled to a corresponding bit line to read the voltage on the bit line and determine the data in a memory cell to be read and located on the bit line using a potential state and a threshold voltage value corresponding to the memory cell.

The 3D block BLKn may include multiple string select lines SSL 156 disposed above the top of each of the memory cell strings 154 or above the top of a topmost page. The ground select line GSL 158 may be a conductive line or a conductive layer formed at the bottom of each page (or word line layer). The common source line CSL 159 may be a conductive layer or a plurality of conductive lines formed below the ground select line GSL 158, which is on a substrate of a 3D storage chip. A number of virtual lines or corresponding layers (not shown) may also be disposed between the string select line SSL 156 and the topmost page, or between the ground select line GSL 158 and a bottommost page.

Figure 2:
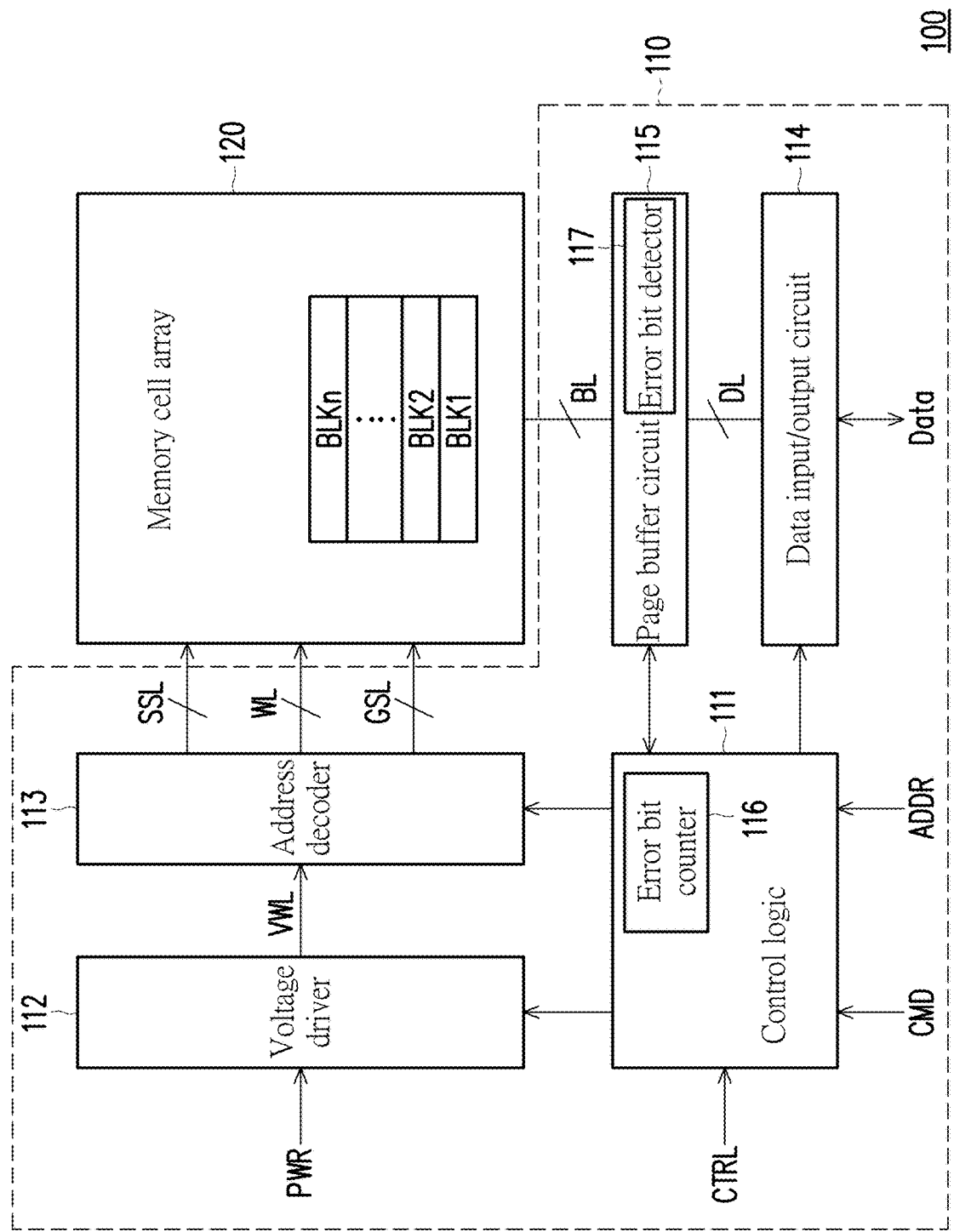
FIG. 2 is a functional block diagram of a memory device according to an embodiment of the disclosure.

FIG. 2 is a functional block diagram of a memory device 100 according to an embodiment of the disclosure. The memory device 100 includes a memory cell array 120 and a memory controller 110. The memory cell array 120 may include one or more 3D blocks BLK1 to BLKn. Each of the 3D blocks (e.g., the 3D block BLKn in FIG. 1) may include a plurality of pages. All of the plurality of memory cells on each page are coupled to the same word line.

The memory controller 110 includes multiple hardware, e.g., a control logic 111, a voltage driver 112, an address decoder 113, a data input/output circuit 114, and a page buffer circuit 115. Each of the hardware in the memory controller 110 controls access of data from the memory cell array through the interplay of signals including a power PWR, a control signal CTRL, a command CMD, a data Data, and an address ADDR. In detail, the control logic 111 controls the voltage driver 112, the address decoder 113, the data input/output circuit 114, and the page buffer circuit 115. The voltage driver 112 provides a word line voltage VWL to the address decoder 113 according to the power PWR. The address decoder 113 is controlled by the control logic 111, thereby generating corresponding signals on the string select line SSL, the word line WL and the ground select line GSL. The data input/output circuit 114 is controlled by the control logic 111 and provides a corresponding signal on the data line DL to the page buffer circuit 115 based on the data Data. The page buffer circuit 115 is controlled by the control logic 111 and, based on the corresponding signal on the data line DL, provides a corresponding signal on the bit line BL to the memory cell array 120 and the 3D blocks BLK1 to BLKn therein. The control method and a corresponding process of the memory device described in this embodiment may be realized based on each of the hardware in FIG. 2.

The control logic 111 in FIG. 2 may further include an error bit counter 116. The error bit counter 116 counts the number of memory cells in a predetermined potential state in a specific memory cell area. In another embodiment consistent with the disclosure, the page buffer circuit 115 may further include an error bit detector 117. The error bit detector 117 also counts the number of memory cells in a predetermined potential state in a specific memory cell area. The error bit detector 117 may include a plurality of comparators in an analogous form and is disposed in the page buffer circuit 115. In this embodiment, as long as one of the error bit counter 116 and the error bit detector 117 is available, the counting operation of the read memory cell may be realized. A person applying this embodiment may also realize the counting operation of the read memory cell through other methods and hardware.

Figure 3:
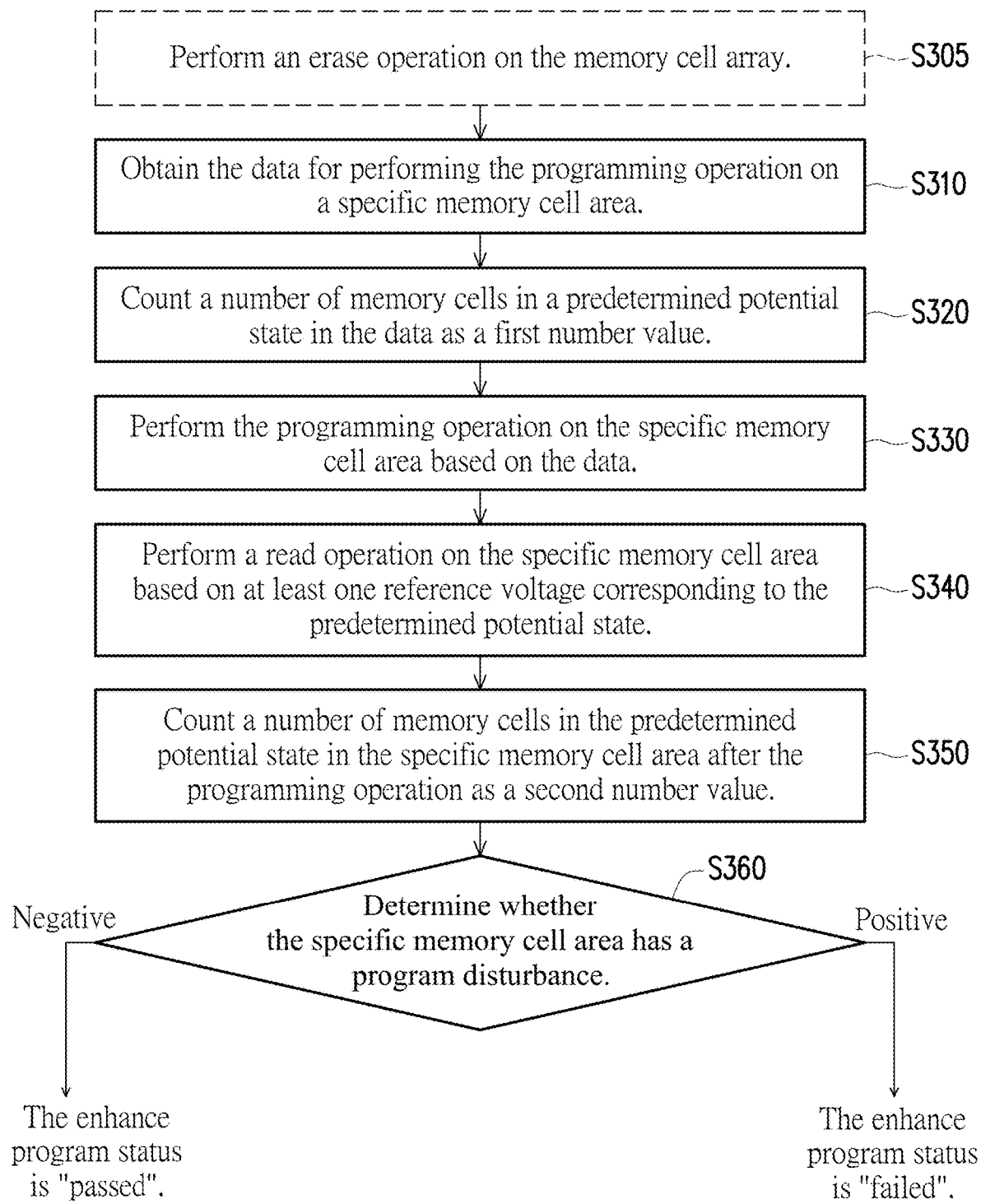
FIG. 3 is a flowchart of a control method of a memory device according to an embodiment of the disclosure.

FIG. 3 is a flowchart of a control method of a memory device according to an embodiment of the disclosure. The control method described in FIG. 3 may be realized through the memory device in FIG. 1 or FIG. 2. Moreover, the control method described in FIG. 3 may be applied to memory devices having different memory cell types. For example, the type of the plurality of memory cells in the memory cell array 120 in FIG. 2 may be single-level cell (SLC) type or multi-level type. The multi-level type may be one of the multi-level cell (MLC) type, triple-level cell (TLC) type, and more-level cell (XLC) type. The more-level cell (XLC) type means that one cell stores more than 1-bit data. The control method in this embodiment may be used to determine whether a selected specific memory cell area (e.g., a page in a memory cell array or one-eighth of a page in the memory cell array) has a more severe program disturbance, thereby identifying potential memory areas where read errors are likely to occur.

In Step S305, the memory controller 110 may perform an erase operation on the entire memory cell array 120. Step S305 mainly sets the memory cells in the entire memory cell array 120 to the same state (e.g., setting all the memory cells to an erase state) so that the subsequent programming operation may be performed successfully.

In Step S310, the memory controller 110 may obtain the data for performing the programming operation on a specific memory cell area. The data for performing the programming operation may be obtained from a control logic (e.g., the control logic 111 in FIG. 2), a data input/output circuit (e.g., the data input/output circuit 114 in FIG. 2), or a page buffer circuit (e.g., the page buffer circuit 115 in FIG. 2) in the memory controller 110.

The specific memory cell area is one of the plurality of memory cell areas in the memory cell array 120. In detail, the memory cell array 120 may include a plurality of 3D blocks BLK to BLKn, and each of the 3D blocks may include a plurality of pages. A specific memory cell area may be a specific page or a part of a specific page (e.g., half of a page, one-fourth of a page, or one-eighth of a page) predetermined by a person applying this embodiment. In other words, this embodiment does not intend to limit the number of memory cells or the dividing method in this specific memory cell area as long as the specific memory cell area is located in the memory cell array 120. The state of each memory cell of each page may be similar. In this embodiment, whether a part of a page (e.g., one-eighth of a page) has a more severe program disturbance may be determined so as to determine whether other parts of the page have more severe program disturbances as well.

In Step S320, the memory controller 110 counts the number of memory cells in a predetermined potential state in the data obtained in Step S310 as a first number value C1. The predetermined potential state is a potential state or a plurality of adjacent potential states that may be predetermined by a person applying this embodiment. For example, in a first embodiment of FIG. 4, the predetermined potential state is set to an erase state E. In a second embodiment of FIG. 5, the predetermined potential state is set to a seventh potential state P7. In a third embodiment of FIG. 6, the predetermined potential state is set to the erase state E and an adjacent first potential state P1.

When the memory controller 110 counts the number of memory cells in the predetermined potential state in the data, the counting is performed promptly and does not affect the entire operation efficiency of the memory device 100 as no operation on the memory cell array 120 is required. Step S310 and Step S320 may be completed before the programming operation is performed on the memory cell array 120.

In Step S330, the memory controller 110 performs the programming operation on the specific memory cell area in the memory cell array based on the aforementioned data.

In Step S340, the memory controller 110 performs a read operation on the specific memory cell area based on at least one reference voltage corresponding to the predetermined potential state. A detailed description of the reference voltage in Step S340 will be provided later with FIGS. 4 to 6.

In Step S350, the memory controller 110 counts the number of memory cells in the predetermined potential state in the specific memory cell area after the programming operation as a second number value C2. In detail, referring to both FIGS. 2 and 3 at the same time, after the read operation in Step S340, the read data of the specific memory cell area is located in the page buffer circuit 115 in the memory controller 110. Therefore, in this embodiment, the second number value C2 may be obtained by counting the read data in the page buffer circuit 115 through the error bit counter 116 in the control logic 111. Alternatively, in this embodiment, the second number value C2 may be obtained by counting the read data in the page buffer circuit 115 through the error bit detector 117. The counting in Step S350 might be affected by the number of memory cells in the specific memory cell area, which might affect the counting efficiency in Step S350.

In Step S360, the memory controller 110 determines whether the specific memory cell area has a program disturbance based on the first number value C1 and the second number value C2. In detail, in this embodiment, a signal flag may be used to report whether this specific memory cell area has a more severe program disturbance. For example, when the signal flag is the value "0", it means that the specific memory cell area has a less severe program disturbance, i.e., the enhance program status is "passed". When the signal flag is the value "1", it means that the specific memory cell area has a more severe program disturbance, i.e., the enhance program status is "failed". Based on the difference in terms of the predetermined potential state, the program disturbance determination in Step S360 is adjusted correspondingly. Therefore, a description with examples will be provided through the following embodiments and FIGS. 4 to 6.

Figure 4:
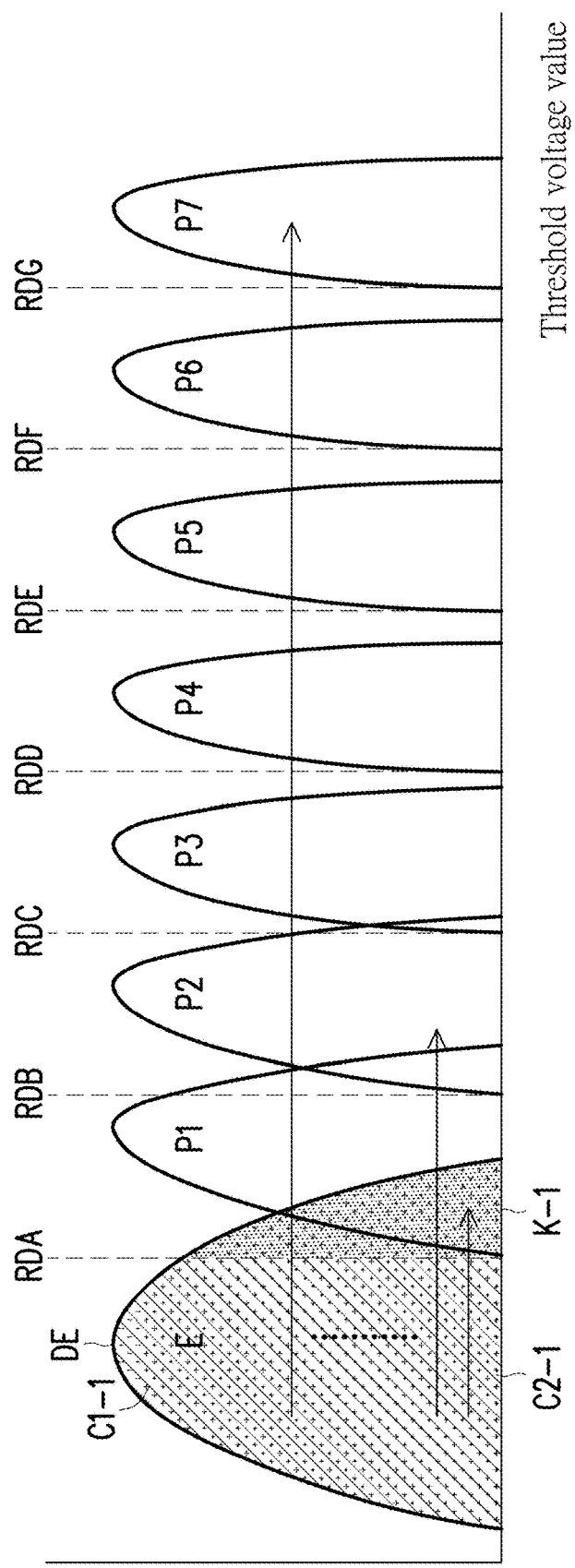
FIG. 4 is a schematic diagram using memory cells of a triple-level cell (TLC) type as an example for illustrating the threshold voltage distribution and the counting of the number of memory cells whose predetermined potential state is an erase state E according to a first embodiment of the disclosure.

FIG. 4 is a schematic diagram using memory cells of TLC type as an example for illustrating the threshold voltage distribution and the counting of the number of memory cells whose predetermined potential state is an erase state E according to the first embodiment of the disclosure. Memory cells of TLC type may have eight potential states. The erase state E and the first to seventh potential states P1 to P7 are shown herein. These potential states are separated from each other through reference voltages RDA to RDG. For convenience of description, the reference voltages RDA~RDG are referred to as the first reference voltage RDA, the second reference voltage RDB . . . the seventh reference voltage RDG respectively.

In the first embodiment, the predetermined potential state is set to the erase state E. Therefore, the reference voltage corresponding to the predetermined potential state (the erase state E) in Step S330 in FIG. 3 is set to the first reference voltage RDA located between the erase state E and the first potential state P1. An erase state distribution curve DE in FIG. 4 shows the number of memory cells in the erase state E in the data for the programming operation (i.e., a first number value C1-1). The erase state distribution curve DE below the first reference voltage RDA in FIG. 4 shows the number of memory cells (i.e., a second number value C2-1) in the erase state E in the specific memory cell area after the programming operation. A comparison value K-1 is the first number value C1-1 minus the second number value C2-1.

In other words, the first number value C1-1 is the number of memory cells expected to be in the predetermined potential state in the specific memory cell area, while the second number value C2-1 is the actual number of memory cells actually in the predetermined potential state in the specific memory cell area after the programming operation. Therefore, when the comparison value K-1, which is the first number value C1-1 minus the second number value C2-1, is less than or equal to a preset value (e.g., a preset value M), i.e., the result of Step S360 in FIG. 3 is negative, it means that fewer memory cells are not in the predetermined potential state, and most of the memory cells are in the predetermined potential state. Therefore, a signal flag is set to the value "0", indicating that the enhance program status of the embodiment is "passed". In other words, when the comparison value K-1 is less than or equal to the preset value M, it will be determined that the specific memory cell area does not have the program disturbance.

Conversely, when the comparison value K-1 (the first number value C1-1 minus the second number value C2-1) is greater than or equal to the preset value M, i.e., the result of Step S360 is positive, it means that more memory cells are not in the predetermined potential state. Therefore, the signal flag is set to the value "1", indicating that the enhance program status of the embodiment is "failed". In other words, when the comparison value K-1 is greater than the preset value M, it will be determined that the specific memory cell area has the program disturbance.

Figure 5:
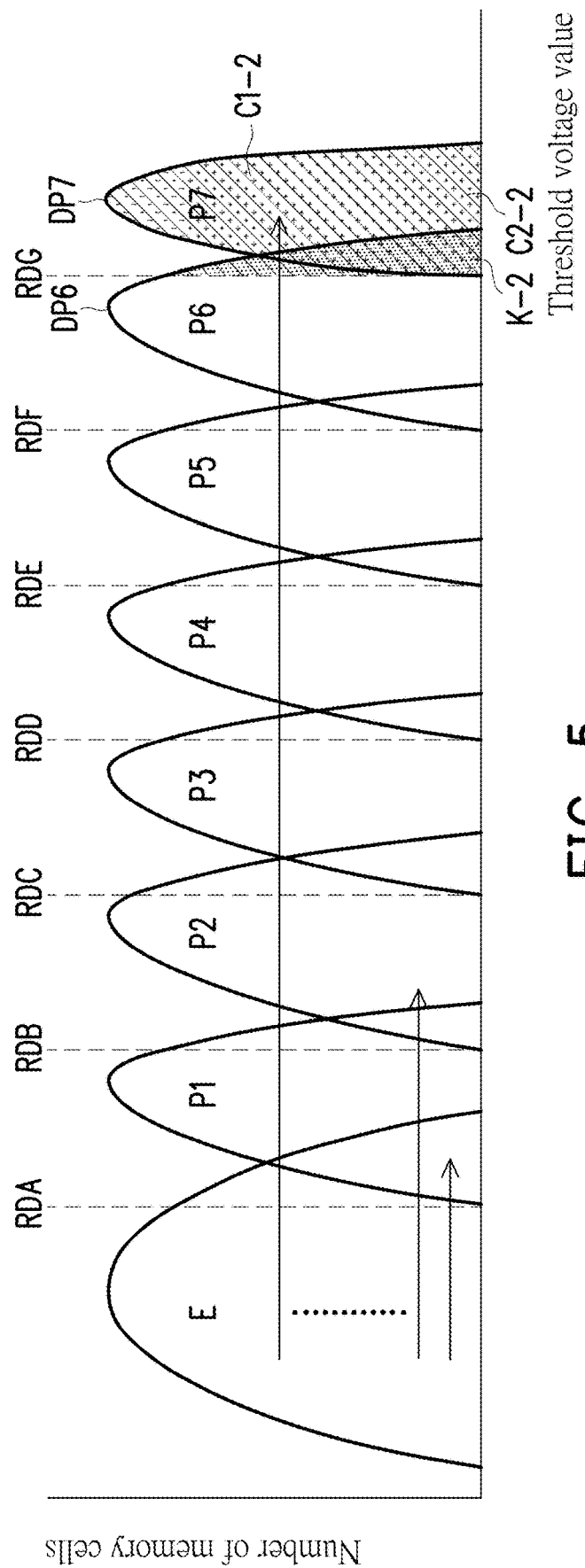
FIG. 5 is a schematic diagram using memory cells of a TLC type as an example for illustrating the threshold voltage distribution and the counting of the number of memory cells whose predetermined potential state is a seventh potential state P7 according to a second embodiment of the disclosure.

FIG. 5 is a schematic diagram using memory cells of a TLC type as an example for illustrating the threshold voltage distribution and the counting of the number of memory cells whose predetermined potential state is the seventh potential state P7 according to the second embodiment of the disclosure. In the second embodiment, the predetermined potential state is set to the seventh potential state P7. Therefore, the reference voltage corresponding to the predetermined potential state (the seventh potential state P7) in Step S330 in FIG. 3 is set to the seventh reference voltage RDG located between the sixth potential state P6 and the seventh potential state P7. A seventh potential state distribution curve DP7 in FIG. 5 shows the number of memory cells (i.e., a first number value C1-2) in the seventh potential state P7 in the data for the programming operation. The seventh potential state distribution curve DP7 and a part of a sixth potential state distribution curve DP6 above the reference voltage RDG in FIG. 5 show the actual number of memory cells (i.e., the second number value C2-2) in the seventh potential state P7 in the specific memory cell area after the programming operation. It is specifically noted that threshold voltages of a part of the memory cells in the sixth potential state distribution curve DP6 shift above the reference voltage RDG due to program disturbances, leading to an increase in the actual number of memory cells in the seventh potential state P7 after the programming operation, that is, the increase is a result of errors caused by program disturbances. Memory cells in an overlapping part of the sixth potential state distribution curve DP6 and the seventh potential state distribution curve DP7 are counted more than once.

In other words, the part of the memory cells in the sixth potential state distribution curve DP6 that is greater than the reference voltage RDG is a comparison value K-2. The comparison value K-2 in this embodiment is the value of the second number value C2-2 minus the first number value C1-2. Thus, when the comparison value K-2, which is the second number value C2-2 minus the first number value C1-2, is less than or equal to a preset value (e.g., the preset value M), i.e., the result of Step S360 in FIG. 3 is negative, it means that fewer memory cells which should be in the sixth potential state P6 shift to the seventh potential state P7, and most of the memory cells in the sixth potential state P6 remain in the sixth potential state P6. Therefore, a signal flag is set to the value "0", indicating that the enhance program status is "passed". In other words, it will be determined that the specific memory cell area does not have the program disturbance.

Conversely, when the comparison value K-2 (the second number value C2-2 minus the first number value C1-2) is greater than or equal to the preset value M, i.e., the result of Step S360 in FIG. 3 is positive, it means that more memory cells which should be in the sixth potential state P6 shift to the seventh potential state P7. Therefore, the signal flag is set to the value "1", indicating that the enhance program status is "failed". In other words, it will be determined that the specific memory cell area has the program disturbance.

Figure 6:
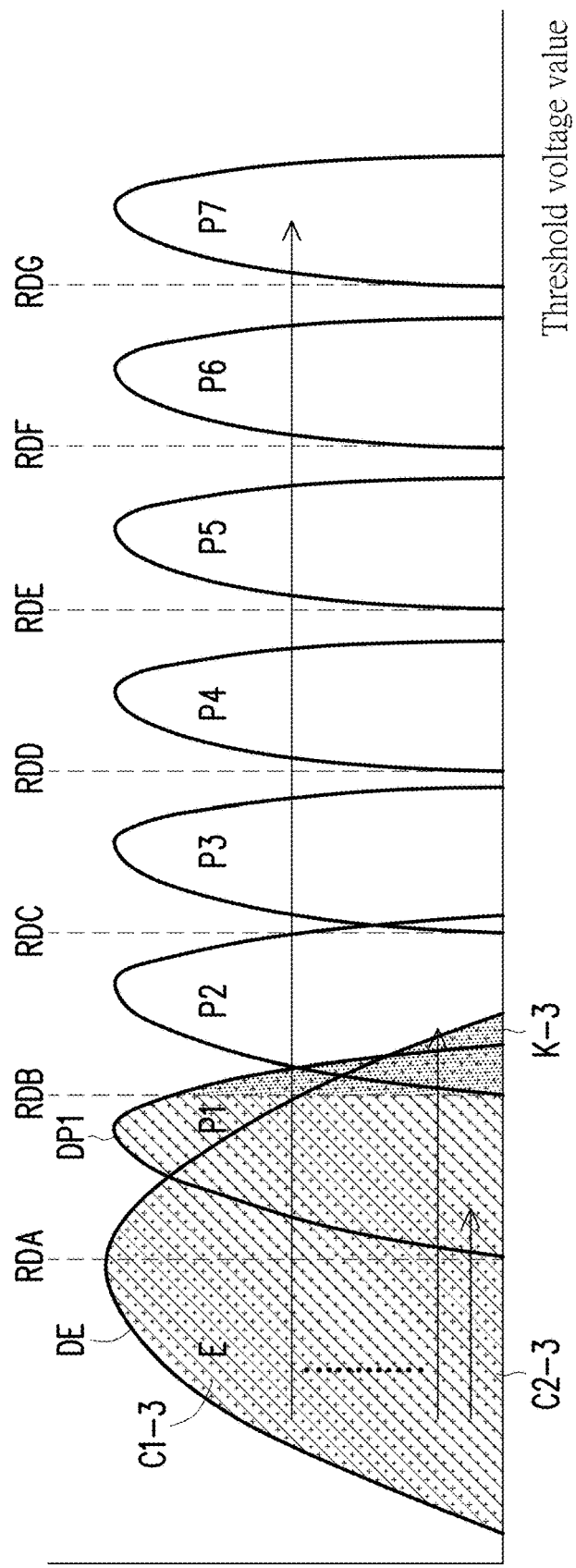
FIG. 6 is a schematic diagram using memory cells of a TLC type as an example for illustrating the threshold voltage distribution and the counting of the number of memory cells whose predetermined potential state is both an erase state and a first potential state according to a third embodiment of the disclosure.

FIG. 6 is a schematic diagram using memory cells of a TLC type as an example for illustrating the threshold voltage distribution and the counting of the number of memory cells whose predetermined potential state is both the erase state E and the first potential state P1 according to the third embodiment of the disclosure. In the third embodiment, the predetermined potential state is set to the erase state E and the adjacent first potential state P1. Therefore, the reference voltage corresponding to the predetermined potential state (the erase state E and the first potential state P1) in Step S330 in FIG. 3 is set to a second reference voltage RDB located between the first potential state P1 and the second potential state P2.

The erase state distribution curve DE and the first potential state distribution curve DP1 in FIG. 6 respectively show the number of memory cells (i.e., a first number value C1-3) in the erase state E and in the first potential state P1 in the data for the programming operation. Memory cells in an overlapping part of the erase state distribution curve DE and the first potential state distribution curve DP1 are counted more than once.

The erase state distribution curve DE and a part of the first potential state distribution curve DP1 below the reference voltage RDB in FIG. 6 show the actual number of memory cells (i.e., a second number value C2-3) in the erase state E and the first potential state P1 in the specific memory cell area after the programming operation. A comparison value K-3 is the first number value C1-3 minus the second number value C2-3.

In other words, the first number value C1-3 is the number of memory cells expected to be in the predetermined potential state (i.e., the erase state E and the first potential state P1) in the specific memory cell area, while the second number value C2-1 is the actual number of memory cells actually in the erase state E and the first potential state P1 in the specific memory cell area after the programming operation. Therefore, when the comparison value K-3, which is the first number value C1-3 minus the second number value C2-3, is less than or equal to a preset value (e.g., the preset value M), i.e., the result of Step S360 in FIG. 3 is negative, it means that fewer memory cells are not in the predetermined potential state, and most of the memory cells are in the predetermined potential state. Therefore, a signal flag is set to the value "0", indicating that the enhance program status is "passed". In other words, it will be determined that the specific memory cell area does not have the program disturbance.

Conversely, when the comparison value K-3 (the first number value C1-3 minus the second number value C2-3) is greater than or equal to the preset value M, i.e., the result of Step S360 is positive, it means that more memory cells are not in the predetermined potential state. Therefore, the signal flag is set to the value "1", indicating that the enhance program status is "failed". In other words, it will be determined that the specific memory cell area has the program disturbance.

In summary, the memory device and the control method thereof described in the embodiments of the disclosure are used for counting the number of memory cells in the predetermined potential state in a specific memory cell area after the programming operation and comparing the number of the memory cells with the number of memory cells in the predetermined potential state in data used for performing the programming operation, thereby determining whether the specific memory cell area has a more severe program disturbance. Through the control method, particular memory cell areas in a memory cell array and having more severe program disturbances may be marked, thereby facilitating other operations of the memory device (e.g., reducing the use of memory cell areas having more severe program disturbances, determining whether to re-perform the programming operation, etc.), or providing references to users or manufacturers when using the memory device so as to improve the data reliability of the memory device.

What is claimed is:

1. A control method of a memory device, wherein the memory device comprises a memory cell array having a plurality of memory cell areas, the control method comprising:
obtaining a data for performing a programming operation on a specific memory cell area, wherein the specific memory cell area is one of the plurality of memory cell areas;
counting a number of memory cells in a predetermined potential state in the data as a first number value;
performing the programming operation on the specific memory cell area based on the data;
performing a read operation on the specific memory cell area based on at least one reference voltage corresponding to the predetermined potential state;
counting a number of memory cells in the predetermined potential state in the specific memory cell area after the programming operation as a second number value; and
determining whether the specific memory cell area has a program disturbance based on the first number value and the second number value.

2. The control method of claim 1, wherein the predetermined potential state is a preset potential state or a plurality of adjacent potential states.

3. The control method of claim 1, further comprising:
performing an erase operation on the memory cell array before the programming operation.

4. The control method of claim 1, wherein a type of a plurality of memory cells in the memory cell array is a single-level cell type or a multi-level type, wherein the multi-level type means that one cell stores more than 1-bit data.

5. The control method of claim 1, wherein the memory cell area is a page of the memory cell array or a part of the page.

6. The control method of claim 1, wherein a type of a plurality of memory cells in the memory cell array is a triple-level cell type, and the each of the memory cells have an erase state, a first potential state to a seventh potential state.

7. The control method of claim 6, wherein the redetermined potential state is set to the erase state, the at least one reference voltage corresponding to the predetermined potential state is set to a first reference voltage located between the erase state and the first potential state, the second number is a number of memory cells in the erase state in the specific memory cell area after the programming operation.

8. The control method of claim 7, wherein a step for determining whether the specific memory cell area has the program disturbance based on the first number value and the second number value comprising:
subtracting the second number value form the first number value to obtain a comparison value; and
determining whether the comparison value is less than or equal to a preset value to determine whether the specific memory cell area has the programmed interference.

9. The control method of claim 8, wherein a step for determining whether the comparison value is less than or equal to a preset value to determine whether the specific memory cell area has the programmed interference comprising:
when the comparison value is less than or equal to the preset value, the specific memory cell area does not have the programmed interference is determined.

10. The control method of claim 6, wherein the redetermined potential state is set to the seventh potential state, the at least one reference voltage corresponding to the predetermined potential state is set to a seventh reference voltage located between the sixth potential state and the seventh potential state,
the second number is a number of memory cells in the seventh potential state in the specific memory cell area after the programming operation.

11. The control method of claim 10, wherein a step for determining whether the specific memory cell area has the program disturbance based on the first number value and the second number value comprising:
subtracting the first number value form the second number value to obtain a comparison value; and
determining whether the comparison value is less than or equal to a preset value to determine whether the specific memory cell area has the programmed interference.

12. The control method of claim 6, wherein the redetermined potential state is set to the erase state and the first potential state, the at least one reference voltage corresponding to the predetermined potential state is set to a second reference voltage located between the first potential state and the second potential state,
the second number is a number of memory cells in the erase state and the first potential state in the specific memory cell area after the programming operation.

13. The control method of claim 12, wherein a step for determining whether the specific memory cell area has the program disturbance based on the first number value and the second number value comprising:
subtracting the second number value form the first number value to obtain a comparison value; and
determining whether the comparison value is less than or equal to a preset value to determine whether the specific memory cell area has the programmed interference.

14. A memory device, comprising:
a memory cell array, comprising a plurality of memory cell areas; and
a memory controller, used for controlling the memory cell array,
the memory controller being used for:
obtaining a data for performing a programming operation on a specific memory cell area, wherein the specific memory cell area is one of the plurality of memory cell areas;
counting a number of memory cells in a predetermined potential state in the data as a first number value;
performing the programming operation on the specific memory cell area based on the data;
performing a read operation on the specific memory cell area based on at least one reference voltage corresponding to the predetermined potential state;
counting a number of memory cells in the predetermined potential state in the specific memory cell area after the programming operation as a second number value; and
determining whether the specific memory cell area has a program disturbance based on the first number value and the second number value.

15. The memory device of claim 14, wherein the predetermined potential state is a preset potential state or a plurality of adjacent potential states.

16. The memory device of claim 14, wherein the memory controller is further used for:
    performing an erase operation on the memory cell array before the programming operation.

17. The memory device of claim 14, wherein a type of a plurality of memory cells in the memory cell array is a single-level cell type or a multi-level type, wherein the multi-level type means that one cell stores more than 1-bit data.

18. The memory device of claim 14, wherein the memory cell area is a page of the memory cell array or a part of the page.

19. The memory device of claim 14, wherein the memory controller comprises:
    an error bit counter, counting the number of the memory cells in the predetermined potential state in the specific memory cell area.

20. The memory device of claim 14, wherein the memory controller comprises:
    an error bit detector, counting the number of the memory cells in the predetermined potential state in the specific memory cell area.

\* \* \* \* \*